US011971586B2

(12) United States Patent
Braun et al.

(10) Patent No.: US 11,971,586 B2
(45) Date of Patent: Apr. 30, 2024

(54) FIBER OPTIC CONNECTOR END FACE ENCAPSULANT FORMING AND CURING DEVICE

(71) Applicant: COMMSCOPE TECHNOLOGIES LLC, Hickory, NC (US)

(72) Inventors: Dennis Marvin Braun, Waconia, MN (US); Yu Lu, Eden Prairie, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 406 days.

(21) Appl. No.: 17/296,106

(22) PCT Filed: Nov. 20, 2019

(86) PCT No.: PCT/US2019/062431
§ 371 (c)(1),
(2) Date: May 21, 2021

(87) PCT Pub. No.: WO2020/106854
PCT Pub. Date: May 28, 2020

(65) Prior Publication Data
US 2022/0011524 A1  Jan. 13, 2022

Related U.S. Application Data

(60) Provisional application No. 62/770,267, filed on Nov. 21, 2018.

(51) Int. Cl.
*G02B 6/38* (2006.01)
*B08B 5/02* (2006.01)
(Continued)

(52) U.S. Cl.
CPC .............. *G02B 6/3866* (2013.01); *B08B 5/02* (2013.01); *B08B 7/0035* (2013.01); *B08B 13/00* (2013.01);
(Continued)

(58) Field of Classification Search
CPC ....... G02B 6/3866; B08B 5/02; B08B 7/0035; B08B 13/00; B08B 2240/02;
(Continued)

(56) References Cited

U.S. PATENT DOCUMENTS 8,330,944 B2  12/2012  Liu et al.
8,594,479 B2  11/2013  Liu et al.
(Continued)

FOREIGN PATENT DOCUMENTS

EP  0 307 218 A1  3/1989
EP  0307218 A1 *  3/1989  .............. C08L 83/04
(Continued)

OTHER PUBLICATIONS

International Search Report and Written Opinion of the International Searching Authority for International Patent Application No. PCT/US2019/062431 dated Mar. 18, 2020, 9 pages.
(Continued)

*Primary Examiner* — Jerry M Blevins
(74) *Attorney, Agent, or Firm* — MERCHANT & GOULD P.C.

(57) ABSTRACT

Disclosed herein are devices and methods for cleaning, verifying cleaning, and coating a ferrule end face in a single housing thereby preventing contamination of the ferrule end face and associated optical fiber end face. Also disclosed herein is a fiber optic assembly including a ferrule; an optical fiber extending through the ferrule to an end face of the ferrule; and a coating on the end face of the ferrule protecting the optical fiber. The coating is prepared by curing a vinyl-terminated polydimethylsiloxane with a crosslinker in the presence of a catalyst.

14 Claims, 4 Drawing Sheets

(51) Int. Cl.
   *B08B 7/00*       (2006.01)
   *B08B 13/00*     (2006.01)
   *B29D 11/00*     (2006.01)
   *B29C 35/08*      (2006.01)
   *B29K 83/00*      (2006.01)

(52) U.S. Cl.
   CPC .... *B29D 11/00663* (2013.01); *B08B 2240/02* (2013.01); *B29C 35/0805* (2013.01); *B29C 2035/0827* (2013.01); *B29K 2083/00* (2013.01)

(58) Field of Classification Search
   CPC .......... B29D 11/00663; B29C 35/0805; B29C 2035/0827; B29K 2083/00
   USPC ......................................................... 385/78
   See application file for complete search history.

(56) References Cited

U.S. PATENT DOCUMENTS

| | | |
|---|---|---|
| 8,705,931 B2 | 4/2014 | Liu et al. |
| 8,998,503 B2 | 4/2015 | Barnette, Jr. et al. |
| 9,207,307 B2 | 12/2015 | Stolarczyk et al. |
| 9,411,110 B2 | 8/2016 | Barnette, Jr. et al. |
| 2014/0064665 A1* | 3/2014 | Ott .................... G02B 6/387 385/60 |

FOREIGN PATENT DOCUMENTS

| | | | |
|---|---|---|---|
| EP | 2159612 A1 * | 3/2010 | ........... G02B 6/3849 |
| EP | 2 159 612 B1 | 6/2013 | |
| JP | 2002-328260 A | 11/2002 | |
| WO | 2013/126429 A2 | 8/2013 | |
| WO | 2015/017170 A1 | 2/2015 | |
| WO | 2016/195901 A1 | 12/2016 | |
| WO | 2016/195902 A1 | 12/2016 | |
| WO | 2018/009802 A1 | 1/2018 | |
| WO | WO-2018009802 A1 * | 1/2018 | ............... B08B 5/02 |

OTHER PUBLICATIONS

Technical Data Sheet for ELASTOSIL® LR 3003/60 A/B: Liquid Silicone Rubber, Wacker Chemie AG, 2 pages (2014).
Safety Data Sheet for ELASTOSIL® LR 3003/60 A, Material: 60004982Wacker Chemie AG, 8 pages (2015).
Safety Data Sheet for ELASTOSIL® LR 3003/60 B, Material: 60004987, Wacker Chemie AG, 8 pages (2015).
SILOPREN* UV Electro: Liquid Silicone Rubber, Momentive Performance Materials, 4 pages (2013).
SILOPREN* UV LSR 2030 and UV LSR 2060: Liquid Silicone Rubber, Momentive Performance Materials, 4 pages (2014).
Safety Data Sheet for UV Electro 225-1, Momentive Performance Materials, 15 pages (2016).
Safety Data Sheet for Silopren UV LSR 2030, Momentive Performance Materials, 13 pages (2017).

* cited by examiner

FIBER OPTIC CONNECTOR END FACE ENCAPSULANT FORMING AND CURING DEVICE

CROSS-REFERENCE TO RELATED APPLICATION

This application is a National Stage Application of PCT/US2019/062431, filed on Nov. 20, 2019, which claims the benefit of U.S. Patent Application Ser. No. 62/770,267, filed on Nov. 21, 2018, the disclosures of which are incorporated herein by reference in its their entireties. To the extent appropriate, a claim of priority is made to each of the above disclosed applications.

TECHNICAL FIELD

The present disclosure relates generally to fiber optic connectors, and more specifically to protecting an end face of a ferrule of a fiber optic connector.

BACKGROUND

Generally, fiber optic connectors include a ferrule containing an optical fiber on an end face of the connector. The end of the optical fiber is polished. Polishing is necessary to join two optical fibers end to end while preserving the optical signal with little signal loss (attenuation).

Protecting the polished end face is important as contaminants on the end face can greatly impact the performance of the connector by decreasing signal transmission or damaging the end face. Accordingly, connectors are often transported and stored with end caps (i.e., dust caps) that shield the end face from the environment.

U.S. Pat. Nos. 8,594,479; 8,330,944; and 8,705,931 discloses a dust cap assembly including a sealant that is a curable liquid polymer (e.g., an ultraviolet light curable liquid polymer. Any contaminants present on a fiber optic ferrule are adhered to sealant and locked in the sealant upon curing. Accordingly, the contaminants will be removed when the dust cap assembly is removed from the ferrule.

U.S. Pat. No. 9,411,110 discloses a cover for the end face of a fiber optic connector including a rigid end cap having a form-fitting material within the end cap. The form-fitting material comprises a rubberized coating formed from a liquid sealant cured at room temperature. The cover limits access of particulates to the end face of the connector and the form-fitting material draws loose particulates of dust and debris from the end face of the connector upon removal of the cover. U.S. Pat. No. 9,207,307 discloses a similar cover.

EP 2 159 612 is directed to providing an optical fiber connector with a protective coating encasing the end face of a ferrule. The protective coating can be made from an elastic material, in particular plastics like rubber-like materials, for example natural rubber or silicone rubber. According to EP 2 159 612, a glutinous or sticky surface that is characteristic of the material or added to the material can absorb any dirt and dust and leave a clean end face upon removal of the protective coating. Alternatively or additionally, a fluent melt molded on the ferrule forming the protective coating can absorb any dirt and dust. The protective coating formed by the fluent melt can be removed from the ferrule without leaving residue.

However, end caps do not always prevent contamination. Particles from the interior of the end cap may migrate to the end face of the connector, especially when the connectors are being transported. Even when an end cap is on the end face of a connector, micro-passages may be present resulting in communication of particles to the end face of the connector.

Such contamination can damage the end face of a connector and cause signal losses. Therefore, connectors are generally cleaned prior to installation, which takes time and also risks damaging the connectors.

There is a need for methods and devices for protecting the ferrule end face of a fiber optic connector.

SUMMARY

One aspect of the present disclosure relates to a device comprising: a ferrule end face cleaning device in a housing; a device that verifies cleaning performance of the ferrule end face cleaning device in the housing; and a ferrule end face encapsulating device in the housing.

Another aspect of the present disclosure relates to a method, comprising: cleaning an end face of an optical fiber in a ferrule in a housing; inspecting the end face of the optical fiber in the housing; and coating the end face of the optical fiber in a molding cavity. The molding cavity is located in the housing.

Yet another aspect of the present disclosure relates to a fiber optic assembly, comprising: a ferrule; an optical fiber extending through the ferrule to an end face of the ferrule; and a coating on the end face of the ferrule protecting the optical fiber. The coating is prepared by curing a vinyl-terminated polydimethylsiloxane with a crosslinker in the presence of a catalyst.

DETAILED DESCRIPTION

Figure 1:
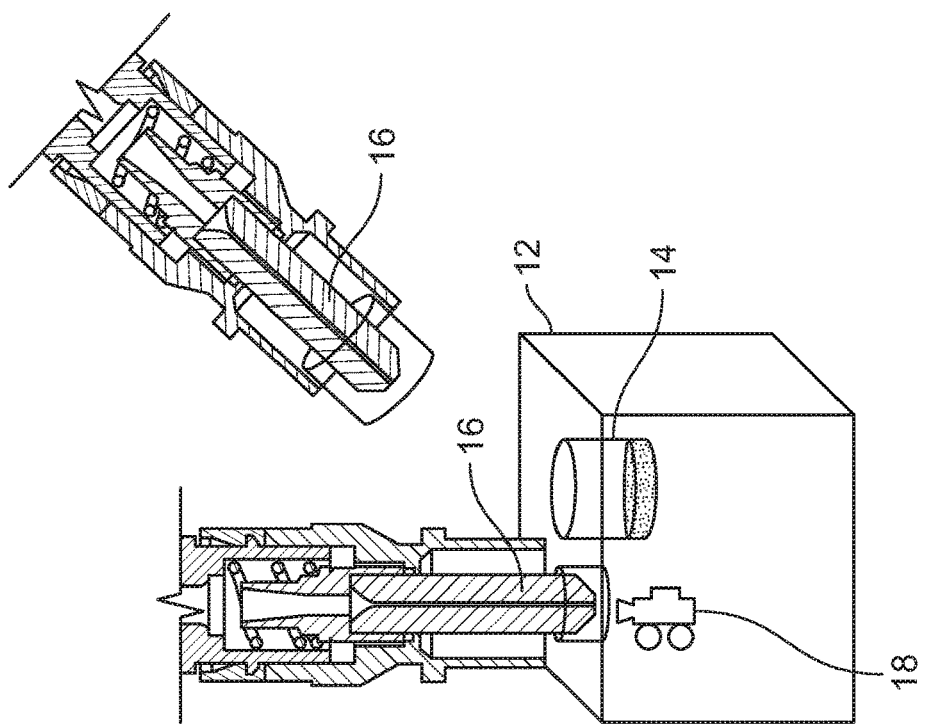
FIG. 1 shows an embodiment of a device having an inspection scope separate from a molding cavity in a housing.
Figure 1:
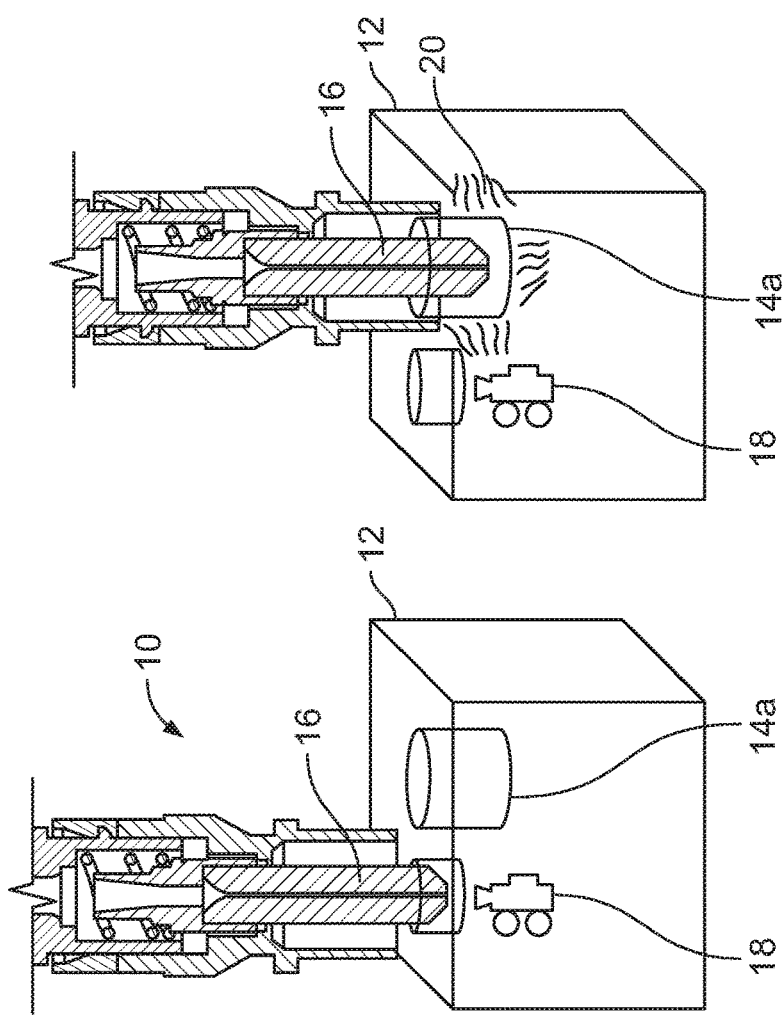

In the following detailed description, reference is made to the accompanying drawings showing by way of illustration specific embodiments of devices and methods disclosed herein. It is to be understood that other embodiments may be utilized and structural or logical changes may be made without departing from the scope of the present disclosure. The following detailed description, therefore, is not to be taken in a limiting sense.

In the figures, common items between the figures are labels with the same reference numeral for simplicity.

Aspects of the present disclosure relate to a device with devices for cleaning, verifying cleaning, and encapsulating a ferrule end face that are integrated into a single housing. Integration of ferrule end face cleaning, cleaning verification, and encapsulation processes into a single housing advantageously prevents contamination on the ferrule end face and associated optical fiber end face by avoiding manual handling and unnecessary exposure. Accordingly, the device promotes end face cleanliness and good optical performance of fiber optic connectors.

Aspects of the present disclosure also relate to a method that cleans, verifies cleaning, and encapsulates a ferrule end face all in a single housing. The method advantageously prevents contamination on the ferrule end face and associated optical fiber end face by avoiding manual handling and unnecessary exposure. Accordingly, the method promotes end face cleanliness and good optical performance of fiber optic connectors.

FIG. 1 depicts an exemplary device 10 including a housing 12 incorporating a ferrule end face encapsulating device having a molding cavity 14. The molding cavity 14 is configured to receive a ferrule 16. The housing 12 also incorporates a device that verifies cleaning performance of the ferrule end face in the form of an inspection scope 18. A ferrule end face cleaning device is also incorporated into the same housing 12, however, FIG. 1 does not depict such ferrule end face cleaning device.

In use, the ferrule end face cleaning device (not depicted) cleans an end face of an optical fiber in a ferrule 16 in the housing 12. Then the device that verifies cleaning performance of the ferrule end face (shown as an inspection scope 18 in FIG. 1) inspects the end face of the optical fiber in the housing 12. The ferrule end face encapsulating device subsequently coats the end face of the optical fiber in the housing 12 (provided that the end face of the optical fiber is clean and does not need re-cleaned and re-inspected). As each of the cleaning, inspecting, and encapsulating steps occurs in the housing 12, the device 10 prevents contamination of the ferrule end face between the cleaning step and the inspecting step and also prevents contamination of the ferrule end face between the inspecting step and the encapsulating step. With the device 10, there is no manual handing of the fiber optic connector between the cleaning, inspecting, and encapsulating steps, which also prevents contamination.

In FIG. 1, the ferrule end face encapsulating device is separate from the device that verifies cleaning performance of the ferrule end face (shown as the inspection scope 18 in FIG. 1). As shown in FIG. 1, the ferrule end face encapsulating device further includes a UV source 20. During the encapsulating step, the molding cavity 14 is filled with an encapsulant materials/precursors susceptible to UV curing. The ferrule end face is inserted into the filled molding cavity 14a and the UV 20 source cures the encapsulant materials/precursors on the ferrule end face thereby protecting the ferrule end face.

FIG. 1 shows three stages of the device 10 in use. First, FIG. 1 shows inspection of the ferrule end face (after cleaning in the housing 12) with the inspection scope 18 while the molding cavity 14 is filled with the encapsulant materials/precursors. Next, FIG. 1 shows insertion of the ferrule end face into the filled molding cavity 14a and curing of the encapsulant materials/precursors on the ferrule end face by the UV source 20 to form a coating. Finally, FIG. 1 shows removal of the encapsulated ferrule end face from the molding cavity 14 and another ferrule end face being inspected (after cleaning in the housing 12) with the inspection scope 18 while filling of the molding cavity 14 is in progress.

The device that verifies cleaning performance of the ferrule end face can be integrated with the ferrule end face encapsulating device. Such integration is illustrated in the device 30 in FIG. 2. Like the device 10, the device 30 includes a housing 12 incorporating a ferrule end face encapsulating device having a molding cavity 14 configured to receive a ferrule 16 and a UV source 20; a device that verifies cleaning performance of the ferrule end face shown as an inspection scope 18; and a ferrule end face cleaning device (not depicted).

Figure 2:
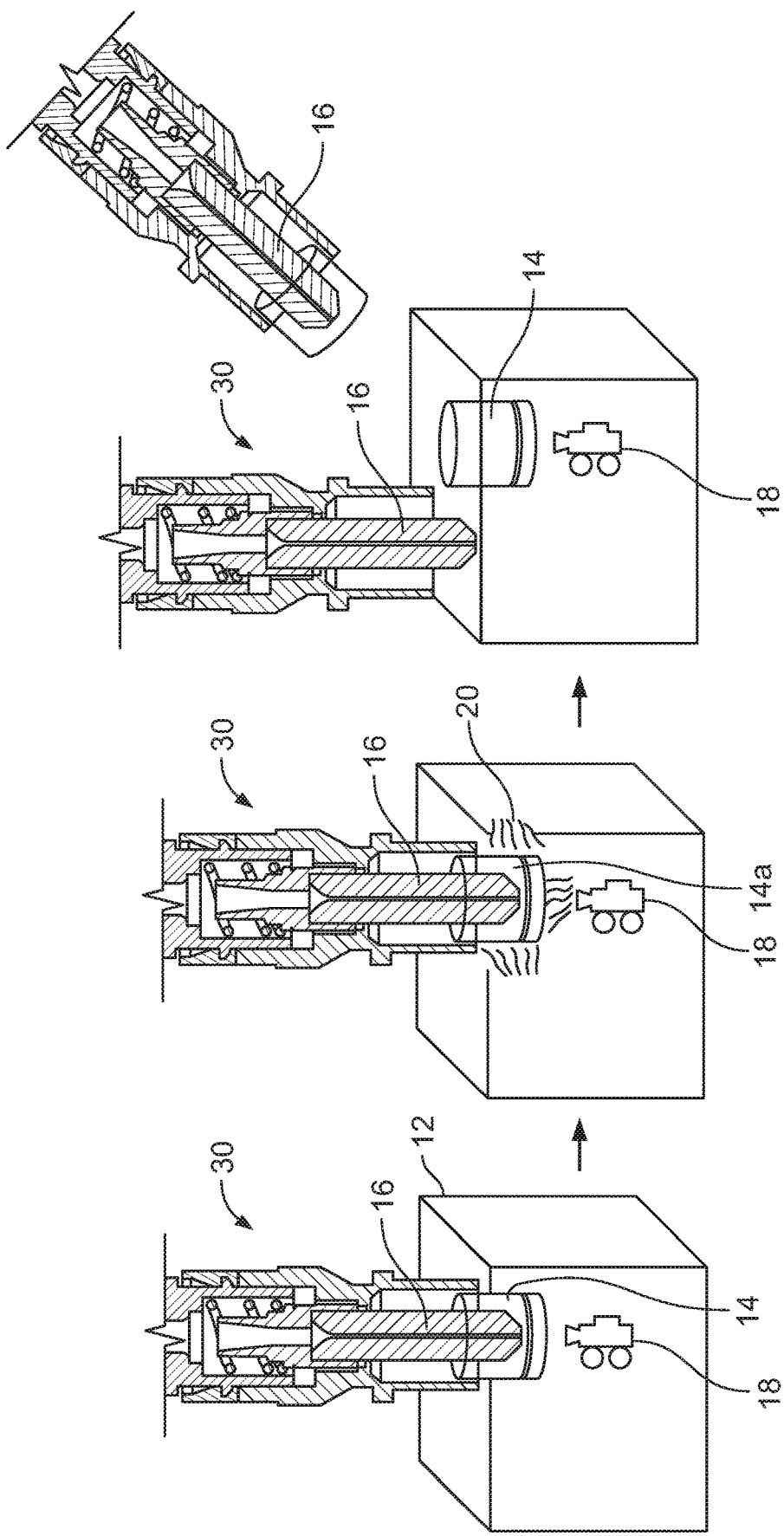
FIG. 2 shows another embodiment of a device having an inspection scope integrated with a molding cavity in a housing.

FIG. 2 shows the inspection scope 18 integrated with the molding cavity 14. In the depicted embodiment, the inspection scope 18 is directly below the molding cavity 14.

FIG. 2 also shows three stages of the device 30 in use. First, FIG. 2 shows inspection of the ferrule end face (after cleaning in the housing 12) with the inspection scope 18. The ferrule end face is inserted into the empty molding cavity 14 and inspected by the inspection scope 18 located directly below the molding cavity. Next, FIG. 2 shows filling of the molding cavity 14 with the encapsulant materials/precursors to provide a filled molding cavity 14a and curing of the encapsulant materials/precursors on the ferrule end face by the UV source 20 to form a coating (provided that the end face of the optical fiber is clean and does not need re-cleaned and re-inspected). Finally, FIG. 2 shows removal of the encapsulated ferrule end face from the molding cavity 14 and another ferrule end face to be inserted into the empty molding cavity 14 and inspected by the inspection scope 18 (after cleaning in the housing 12).

Figure 3:
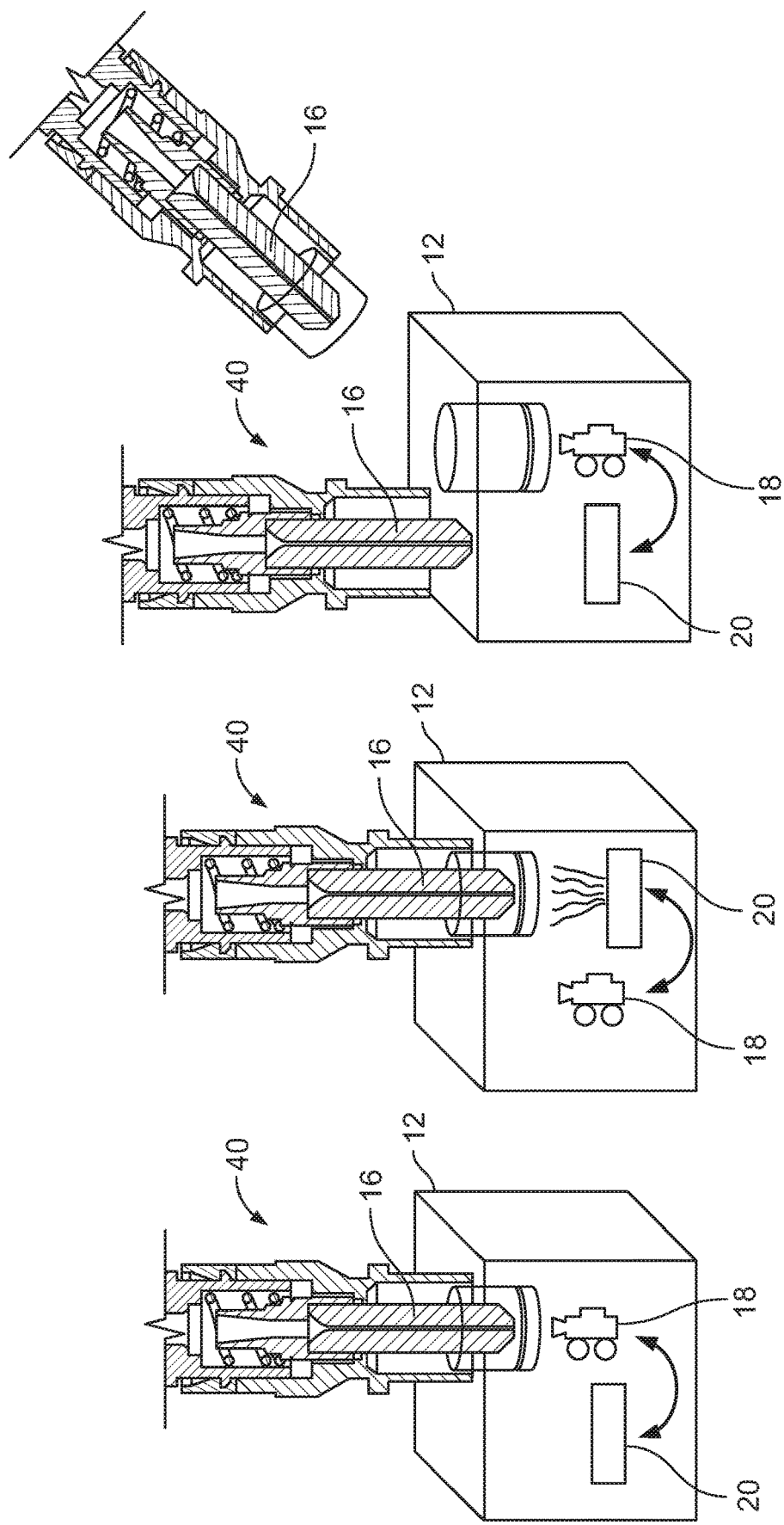
FIG. 3 shows an embodiment of a device having an inspection scope and a UV source cycled below a molding cavity in a housing.

FIG. 3 shows another embodiment of a device 40 in which the device that verifies cleaning performance of the ferrule end face shown as an inspection scope 18 is physically cycled below the molding cavity 14 with the UV source 20. In use, the inspection scope 18 is located directly below the molding cavity during an inspection cycle. Then, during a subsequent encapsulating cycle, the inspection scope 18 is moved from underneath the molding cavity and the UV source 20 is located below the molding cavity 14.

FIG. 3 depicts three stages of the device 40 in use. First, the ferrule end face is inserted into the empty molding cavity 14 (after cleaning in the housing 12) and inspected during an inspection cycle by the inspection scope 18. Next, the inspection scope 18 is moved away from the molding cavity 14 and the UV source 20 is moved directly below the molding cavity 14; the molding cavity 14 is filled with the encapsulant materials/precursors; and the encapsulant materials/precursors are cured by the UV source 20 during an encapsulating cycle (provided that the end face of the optical fiber is clean and does not need re-cleaned and re-inspected). Thereafter, the encapsulated ferrule end face is removed from the molding cavity 14, the inspection scope 18 is moved directly below the empty molding cavity 14 and another ferrule end face is ready to be inserted into the empty molding cavity 14 and inspected (after cleaning in the housing 12).

Figure 4:
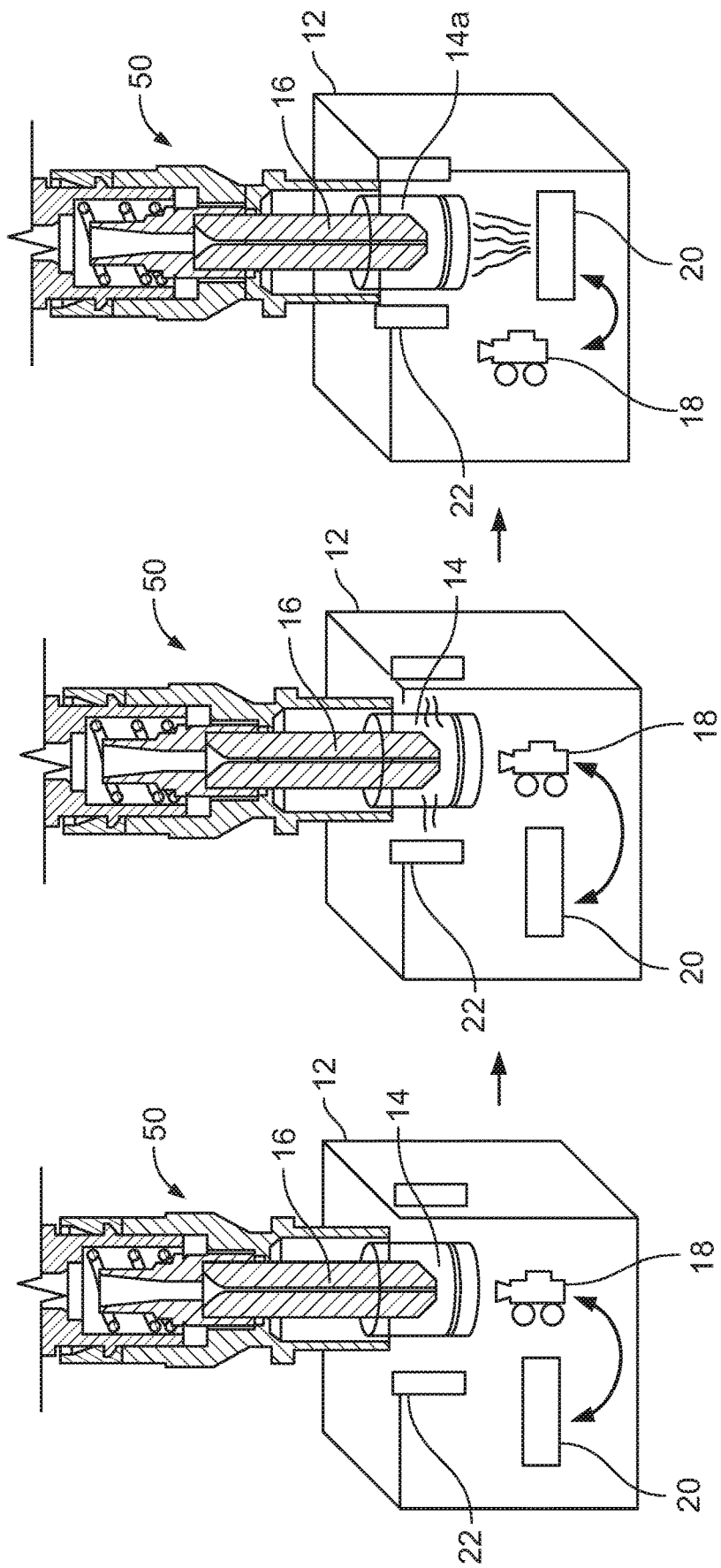
FIG. 4 shows yet another embodiment of a device incorporating a cleaning device integrated with a molding cavity in a housing.

In embodiments, the ferrule end face cleaning device is integrated with the ferrule end face encapsulating device. FIG. 4 illustrates such integration. FIG. 4 depicts a device 50 having each of following in the housing 12: the ferrule end face cleaning device (as a cleaning jet 22); the ferrule end face encapsulating device having the molding cavity 14 and the UV source 20; and the device that verifies cleaning performance of the ferrule end face (as an inspection scope 18). In particular, in FIG. 4, the ferrule end face cleaning device (as a cleaning jet 22) is integrated with the molding cavity 14.

FIG. 4 depicts three stages of the device 50 in use. First, the ferrule end face is inserted into the empty molding cavity 14 and inspected with the inspection scope 18. If the ferrule end face is determined to be contaminated, the cleaning jet 22 cleans the ferrule end face while the ferrule end face remains inserted in the empty molding cavity 14. Alternatively, the ferrule end face can first be cleaned and then inspected after cleaning. Thereafter, the molding cavity 14 is filled with the encapsulating materials/precursors (to provide the filled molding cavity 14a) and the UV source cures the encapsulating materials/precursors to provide an encapsulated ferrule end face (provided that the end face of the optical fiber is clean and does not need re-cleaned and re-inspected). As with the embodiment of the device 40 depicted in FIG. 3, the device 50 of FIG. 4 alternates the position of the inspection scope 18 and the UV source 20 directly below the molding cavity 20 depending on whether the ferrule end face is being inspected or encapsulated.

In embodiments, the ferrule end face cleaning device comprises a cleaning jet. For example, the ferrule end face cleaning device can comprise an ionizing air cleaning jet or a plasma cleaning jet.

Also disclosed herein is a method, comprising: cleaning the end face of an optical fiber in a ferrule in a housing; inspecting the end face of the optical fiber in the housing; and coating the end face of the optical fiber in a molding cavity, wherein the molding cavity is located in the housing. The cleaning step can take place prior to the inspection step. Alternatively, the inspection step can take place prior to the cleaning step. As yet another alternative, a first inspection step can take place prior to the cleaning step and a second inspection step can take place after the cleaning step.

In embodiments, both cleaning and coating the end face of the optical fiber occurs in the molding cavity. In embodiments, inspecting the end face of the optical fiber occurs in the molding cavity. In embodiments, inspecting the end face of the optical fiber does not occur in the molding cavity. Thus, in embodiments, each of cleaning, coating, and inspecting occurs in the molding cavity. In other embodiments, only cleaning and coating occurs in the molding cavity. In yet other embodiments, only coating occurs in the molding cavity and cleaning and inspecting occur outside the molding cavity (yet in the housing).

Ionizing air can clean the end face of the optical fiber. Alternatively, plasma can clean the end face of the optical fiber.

Coating the end face of the optical fiber can comprise filling the molding cavity with a polymer encapsulant and curing the polymer encapsulant. Curing the polymer encapsulant can comprise UV curing.

In embodiments, an inspection scope and a UV source cycle below the molding cavity. Thus, the inspection scope is located below the molding cavity during an inspection cycle and the UV source is located below the molding cavity during a coating cycle. This is illustrated in FIGS. 3 and 4.

Further disclosed herein is a fiber optic assembly. The fiber optic assembly comprises a ferrule. The fiber optic assembly further comprises an optical fiber extending through the ferrule to an end face of the ferrule. The fiber optic assembly also comprises a coating on the end face of the ferrule protecting the optical fiber. The coating is prepared by curing a vinyl-terminated polydimethylsiloxane with a crosslinker in the presence of a catalyst. The vinyl-terminated polydimethylsiloxane can have a weight average molecular weight from 20,000 to 500,000.

The inventors have determined that preparing a coating by curing a vinyl-terminated polydimethylsiloxane with a crosslinker in the presence of a catalyst provides a coating that can later be removed from the end face of the ferrule leaving insignificant or no residue. For example, the coating can be removed from the end face of the ferrule leaving less than 45 nm residue, less than 40 nm residue, less than 35 nm residue, less than 30 nm residue, less than 25 nm residue, less than 20 nm residue, less than 15 nm residue, less than 10 nm residue, less than 5 nm residue, or less than 1 nm residue. Residue referred to herein is measured using time-of-flight secondary ion mass spectroscopy (TOF-SIMS) after a vinyl-terminated polydimethylsiloxane is cured, aged, and removed from a connector end face. $SiC_3H_9$ peaks are monitored during a gas cluster ion beam (GCIB) sputter of the TOF-SIMS analysis area. The time it takes the $SiC_3H_9$ peak to approach zero with a GCIB sputter rate of approximately 1 nm/s for poly(methyl methacrylate) (PMMA) corresponds to the amount of residue. For example, less than 45 seconds corresponds to less than 45 nm.

Reaction of a vinyl-terminated polydimethylsiloxane with a crosslinker and a catalyst is known in the art. The terminal vinyl groups take part in a vulcanization reaction with the crosslinker in the presence of the catalyst. Appropriate crosslinkers that are hydride functional siloxanes are known in the art. An exemplary crosslinker is a trimethylsiloxane terminated copolymer including methylhydrogensiloxane and dimethylsiloxane groups (e.g., Gelest HMS-151). Appropriate catalysts with complexed platinum or rhodium functionality are known in the art. An exemplary catalyst is a platinum-divinyltetramethyldisiloxane complex (e.g., Gelest SIP6831.2). The catalyst concentration can vary from 5 ppm of catalyst as platinum to 200 ppm catalyst as platinum. An exemplary catalyst concentration is 20 ppm of catalyst as platinum.

In embodiments, the ratio of the vinyl-terminated polydimethylsiloxane and the crosslinker to the catalyst used to prepare the coating is about 50 to 1. The hydride to vinyl ratio can be 10:1 to 1:10, 5:1 to 1:5, or 3:1 to 1:3 (e.g., 1.5:1). In embodiments, the coating is prepared by curing the vinyl-terminated polydimethylsiloxane in less than 15 seconds.

From the foregoing detailed description, it will be evident that modifications and variations can be made to the devices, methods, and assemblies disclosed herein without departing from the spirit or scope of the disclosure.

REFERENCE NUMERALS device 10
housing 12
molding cavity 14
filled molding cavity 14a
ferrule 16
inspection scope 18
UV source 20
cleaning jet 22
device 30
device 40
device 50

What is claimed is:

1. A device, comprising:
   a ferrule end face cleaning device in a housing;
   an inspection scope that verifies cleaning performance of the ferrule end face cleaning device in the housing; and
   a ferrule end face encapsulating device in the housing comprising a molding cavity configured to receive a ferrule and a UV source;
   wherein the inspection scope is located below the molding cavity during an inspection cycle and the UV source is located below the molding cavity during an encapsulating cycle.

2. The device of claim 1, wherein the ferrule end face encapsulating device further comprises the UV source.

3. The device of claim 1, wherein the ferrule end face cleaning device is integrated with the molding cavity.

4. The device of claim 1, wherein the inspection scope is integrated with the molding cavity.

5. The device of claim 1, wherein the ferrule end face cleaning device comprises an ionizing air cleaning jet.

6. The device of claim 1, wherein the ferrule end face cleaning device comprises a plasma cleaning jet.

7. A method, comprising:
cleaning an end face of an optical fiber in a ferrule in a housing;
inspecting the end face of the optical fiber in the housing; and
coating the end face of the optical fiber in a molding cavity, wherein the molding cavity is located in the housing;
wherein an inspection scope and a UV source cycle are below the molding cavity, the inspection scope being located below the molding cavity during an inspection cycle, and the UV source being located below the molding cavity during a coating cycle.

8. The method of claim 7, wherein both cleaning and coating the end face of the optical fiber occurs in the molding cavity.

9. The method of claim 8, wherein inspecting the end face of the optical fiber occurs in the molding cavity.

10. The method of claim 8, wherein inspecting the end face of the optical fiber does not occur in the molding cavity.

11. The method of claim 7, wherein ionizing air cleans the end face of the optical fiber.

12. The method of claim 7, wherein plasma cleans the end face of the optical fiber.

13. The method of claim 7, wherein coating the end face of the optical fiber comprises filling the molding cavity with a polymer encapsulant and curing the polymer encapsulant.

14. The method of claim 13, wherein curing the polymer encapsulant comprises UV curing.

\* \* \* \* \*